United States Patent
Bodapati et al.

(10) Patent No.: US 12,400,644 B1
(45) Date of Patent: Aug. 26, 2025

(54) DYNAMIC LANGUAGE MODEL UPDATES WITH BOOSTING

(71) Applicant: Amazon Technologies, Inc., Reno, NV (US)

(72) Inventors: Sravan Babu Bodapati, Redmond, WA (US); Ashish Vishwanath Shenoy, Seattle, WA (US); Monica Lakshmi Sunkara, Sunnyvale, CA (US); Varun Sembium Varadarajan, Redmond, WA (US); Katrin Kirchhoff, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 463 days.

(21) Appl. No.: 17/357,751

(22) Filed: Jun. 24, 2021

(51) Int. Cl.
| | |
|---|---|
| *G10L 15/183* | (2013.01) |
| *G06F 16/951* | (2019.01) |
| *G06F 18/214* | (2023.01) |
| *G06N 20/00* | (2019.01) |
| *G10L 15/06* | (2013.01) |

(52) U.S. Cl.
CPC .......... *G10L 15/183* (2013.01); *G06F 16/951* (2019.01); *G06F 18/2148* (2023.01); *G06N 20/00* (2019.01); *G10L 15/063* (2013.01)

(58) Field of Classification Search
CPC ... G10L 15/183; G10L 15/063; G06F 16/951; G06F 18/2148; G06N 20/00
See application file for complete search history.

(56) References Cited

U.S. PATENT DOCUMENTS

| | | | | |
|---|---|---|---|---|
| 7,996,392 B2* | 8/2011 | Liao | .................... | G06F 16/9535 |
| | | | | 707/723 |
| 9,760,608 B2* | 9/2017 | Cavanagh | ........... | G06F 16/9538 |
| 10,832,664 B2* | 11/2020 | Biadsy | .................... | G10L 15/32 |
| 11,640,556 B2* | 5/2023 | Velagapudi | ......... | G06F 18/2113 |
| | | | | 706/12 |
| 2014/0081636 A1* | 3/2014 | Erhart | .................... | G06Q 50/01 |
| | | | | 704/236 |
| 2020/0327134 A1* | 10/2020 | Freed | .................... | G06F 16/288 |

FOREIGN PATENT DOCUMENTS

CA      2573672 A1 *  2/2006  ........... H04L 67/535

* cited by examiner

*Primary Examiner* — Hai Phan
*Assistant Examiner* — Ian Scott McLean
(74) *Attorney, Agent, or Firm* — Hogan Lovells US LLP

(57) ABSTRACT

Language models may be dynamically updated for trending entities based on tuning data for particular users. A user may provide specific tuning data associated with trending entities within a class to generate a weight map for a language model. A class based model may be trained using the weight map specific for the user for the trending entities. Additionally, weights may be further boosted using a boosting language model to emphasize the trending entities.

20 Claims, 7 Drawing Sheets

DYNAMIC LANGUAGE MODEL UPDATES WITH BOOSTING

BACKGROUND

Users are increasingly utilizing electronic devices to research, locate, and obtain various types of information. For example, users may utilize a search engine to locate information about various items, such as items offered through an electronic marketplace. Additionally, providers may push or otherwise present information to users at regular intervals based on their interests or requests for information. Some search approaches utilizing language models that are trained to identify items associated with certain search terms. However, these language models are often static models that may be expensive to update or change when new terms may be useful to add to the language models. For example, certain information may rapidly become popular, but the language models may not recognize the improved importance of these terms until they are retrained, which may be time and resource intensive.

BRIEF DESCRIPTION OF THE DRAWINGS

Various embodiments in accordance with the present disclosure will be described with reference to the drawings, in which.

DETAILED DESCRIPTION

Figure 1:
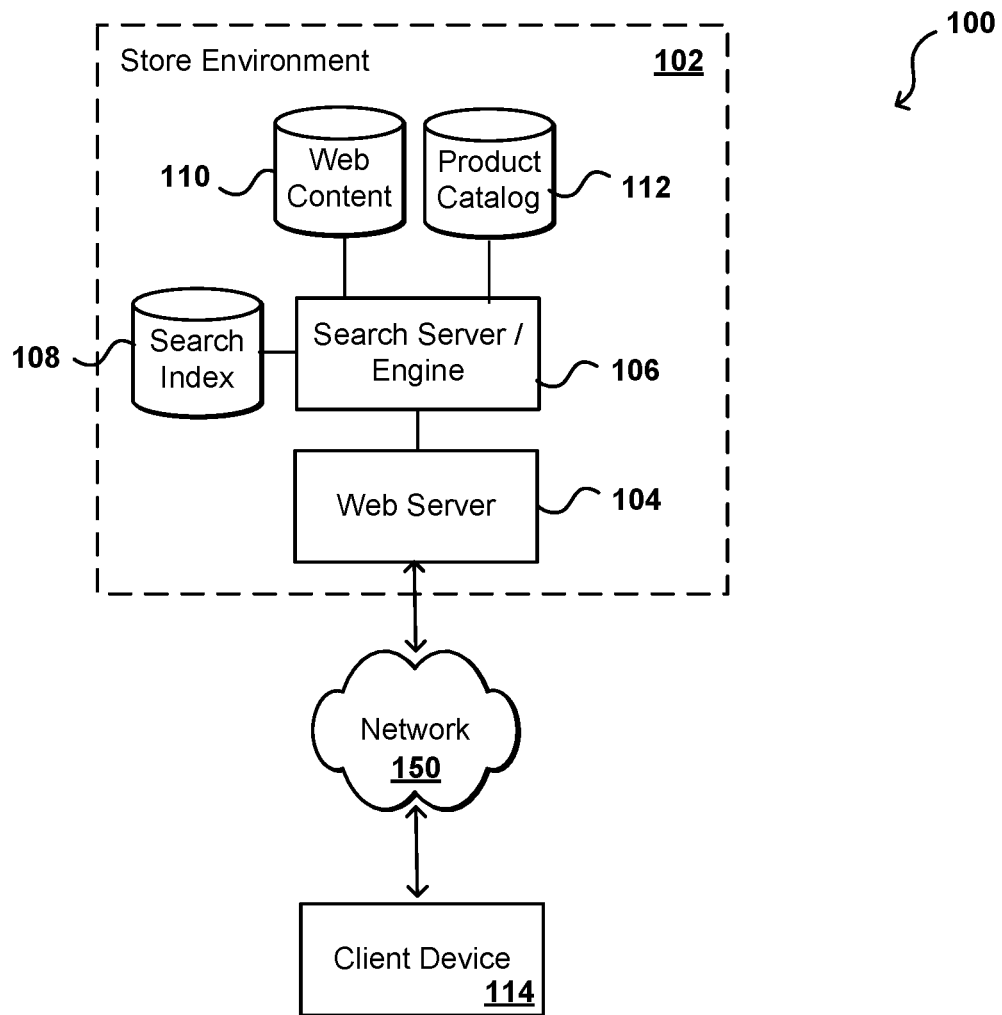
FIG. 1 illustrates components of an environment in which aspects of various embodiments can be implemented.

Approaches in accordance with various embodiments overcome the aforementioned problems with existing technologies by providing a dynamic, lightweight update to various static or substantially static language models. In one or more embodiments, a class based language model may be trained using identified trending or popular entities. This class based language model may be weighted based, at least in part, on a weight map generated by an entity weight tuner that may utilize one or more parameters provided by a user for a specific industry or use case. Moreover, in embodiments, the entity weight tuner may utilize domain based weighting. The class based language model may be utilized with one or more recognition models responsive to user inquiries, such as audio or text-based searches or requests. In at least one embodiment, the model may output an initial hypothesis representation, such as an n-best list or a lattice. In various embodiments, a second language model may be developed, based at least in part on the trending or popular entities, to boost or otherwise rescore certain entities associated with one or more language models. By way of example, the initial hypothesis representation from the class based language model may be evaluated and then rescored by a boosting language model based, at least in part, on the trending or popular entities. The boosting language model may effectively rescore the initial hypothesis representation to provide additional weighting to trending or particularly popular entities. One or more of the lists generated by the class based language model and/or boosting language model, or the models themselves, may be incorporated into a static or substantially static model, to enable dynamic updates of the language model without retraining.

In at least one embodiment, different terms, phrases, or entities may become popular or "trending" at a given period of time. It may be difficult or costly to dynamically update an existing language model to incorporate these terms. Moreover, a period of time these terms are relevant may be unknown, and as a result, the cost and resource use of updating the language models may not be justified for a short-lived trend. However, users, such as content providers, marketplace sellers, and the like, may desire to capture traffic during the period of time that the terms or phrases are trending. In practice, each time some new term needs to be recognized and incorporated into a language model, a full-fledged update is used, which is time and resource intensive. Moreover, using custom vocabulary features is an effective solution because custom vocabulary is often fixed beforehand and does not take into account the context of the text/audio/video for consideration. Accordingly, systems and methods of the present disclosure provide a solution to dynamically improve and tune language models for trending entities.

Various embodiments of the present disclosure are directed toward statistical class based language models that utilizes an entity weight tuner to train a model in accordance with a particular user (e.g., actor, customer, etc.) based, at least in part, on user-provided data and/or on domain classification information. By way of example, a customer may provide a list of trending entities and/or a crawler or the like may develop a list of trending entities. Additionally, in embodiments, the crawler may also server as a forecaster that enables prediction of trending entities, which may be based, at least in part, on previously identified information, such as previously identified trending entities. The customer may also provide tuning data, such as text, audio, video, ground truth pairs, or a combination thereof. In one or more embodiments, the entity weight tuner may utilize features of automatic machine learning (AutoML) (e.g., a series of methods and processes to simplify machine learning) to select weightings for the information provided by the customer. For example, text data may be weighted to minimize perplexity while audio data may be weighted to minimize word error rate (WER). Additionally, in one or more embodiments, a domain classifier may be utilized to determine domain and then apply a weighting based, at least in part, on the trending entities with respect to the domain. Accordingly, in one or more embodiments, the entity weight tuner may be dynamically updated for specific customers, based on their specific needs and tuning data. The weightings may then be referenced by a class based language model.

In one or more embodiments, a second language model, such as a boosting language model, may be used for rescoring or boosting the weights of the trending entities. For example, the weights for the entities could be manually tuned by the customer or could be automatically determined using, by way of example, a clustering algorithm. In one or more embodiments, the class based language model and/or the boosting language model may be used in order to dynamically incorporate the weighted trending entities, for example by enabling one or more dynamic placeholders to point to the weighted portions for particular tuning data.

Various embodiments of the present disclosure enable rapid, lightweight, dynamic updates to language models without undergoing the expensive or resource use of retraining the language models. Accordingly, customers may react to changes in tastes or world events quickly. Furthermore, customers may be provided with a language model with less drift (e.g., changes in use based on context) because the customer may specifically weight or tune the model for their particular industries or needs. In this manner, more frequent updates to language models are enabled with more particularized functionality for individual customers.

FIG. 1 illustrates components of an example computing environment 100 that can be used to implement aspects of the various embodiments. In this example, a user is able to utilize a client device 114 to submit requests for content across one or more networks 150, such as the Internet or a cellular network. The client device can be any appropriate computing device capable of generating such a request, as may include a smartphone, desktop, set-top box (e.g., Fire TV), voice-enabled device (e.g., Echo), or tablet computer. The request may also include a textual request, an audio request, in image request, a video request, or a combination thereof, such as text-based request with an accompanying audio or image sample. In this example, the request may comprise a request for content about one or more products or services that are offered by an entity, such as a retailer or selling partner offering products side-by-side in online stores. It should be understood that a retailer is just one example of such an entity, however, as there may be providers of various other types of content that could take advantage of aspects of the various embodiments as well, as would be understood to one of ordinary skill in the art in light of the teachings and suggestions contained herein. By way of example only, the customer may be part of a subscription service that provides push notifications or information responsive to the user's selections. Accordingly, various embodiments may be directed toward locating information responsive to the user selections.

In this example, the request may be directed to an address associated with a store environment 102, or a set of hardware and software resources utilized by the retailer to provide electronic content, at least some of which may relate to products and/or services offered by the retailer. A store environment in some embodiments includes a collection of network-accessible services executed on computer hardware that provide multiple channels (e.g., mobile app., voice-based search, web access, physical presence, etc.) through which customers (using a client computing device) can access various catalogs stored in databases to find various products and services available to purchase, lease, etc. sometimes in the form of detail pages. Although a single store environment is illustrated, it should be understood that there may be multiple retailers or store environments accessible over the at least one network as discussed elsewhere herein. The products and/or services may be offered for varying types of consumption, such as purchase, rent, lease, download, stream, and the like. Additionally, the store environment may also be directed toward a content presentation environment that provides, responsive to the user request, content such as articles, videos, audio clips, images, and the like. In this example, the request will be received to a server, such as a web server 104, of the store environment 102. The web server 104 can direct the request, or information such as keywords from the request, to a search server 106, search engine, or other such device, service, process, or component that is able to execute the query (or query terms) against a search index 108 corresponding to products or services offered by the retailer. In at least one embodiment, one or more language models may be utilized to weight the search server/engine 106 to influence the results returned from the query. The results can be used to provide relevant information (e.g., title and description) for products and services that are determined to be at least somewhat relevant to the search query. The relevant information can be pulled from a product catalog 112, for example, and combined with web content from a web content repository 110 or other such location, in order to provide a webpage with search results to return to the client device 114 for display. Any of a number of different approaches to determining results from executing one or more search terms against a search index can be utilized within the scope of various embodiments.

As mentioned, however, the accuracy of the search, or relevance of the search results, will depend in large part upon the quality of the search index 108 that is utilized and/or the specificity of the query provided by the user. Current approaches in the area utilize lexical and semantic information to match user queries against products, services, content, or the like. For example, one or more language models can be utilized to determine a relevance or popularity for a given search, which may influence the results presented to the user.

Over time, language models may become less relevant as new entities or phrases become popular or capture attention of users. By way of example, an influential news story or event may lead to different terms, phrases, or entities that may "trend" or otherwise be popular within searches. Additionally, these stories or events may provide new context to an existing term, which may influence how the term is interpreted by a language model. As an example, news of a merger or sale of a company may lead to a surge in searches for the parties involved with the deal. Initially, searches for the company may have lead to items produced by the company or news stories about the company. However, if the event is focused on the stock price or particular executives, the context of the company search may actually be directed toward those features. These changes may be rapid and last for an indeterminant period of time. As a result, it is important for users (e.g., customers, actors, etc.) to be able to incorporate these changes into various language models that they use to sell products, provide information, or interact with their end users. Systems and methods of the present disclosure may address the difficulties presented by these rapidly changing trends by enabling class based training and boosting for entities using information provided by users to custom weight and tune various machine learning systems, such as language models.

Figure 2:
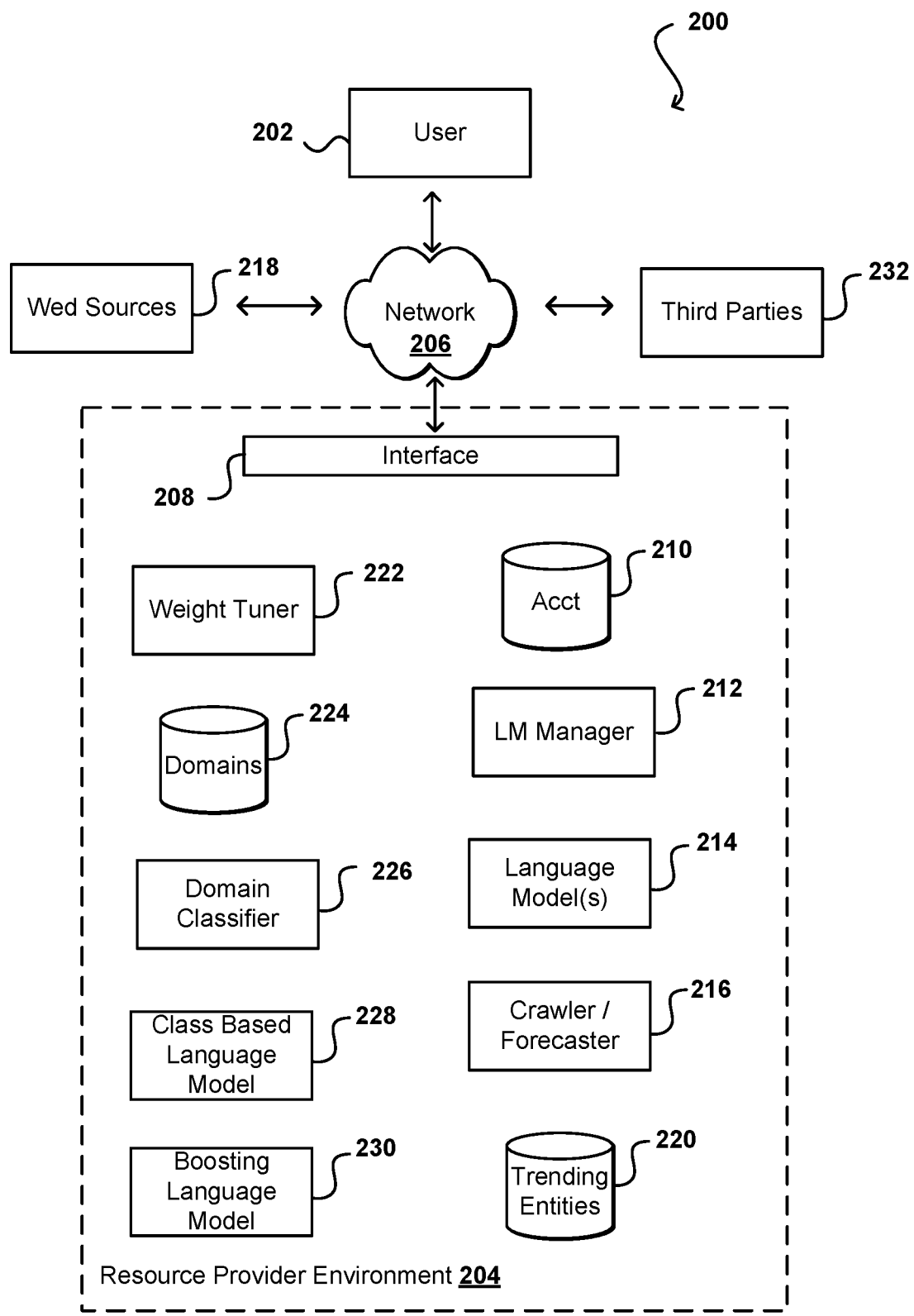
FIG. 2 illustrates components of an environment in which aspects of various embodiments can be implemented.

FIG. 2 is illustrates an example system 200 that can be used to dynamically update one or more language models in accordance with embodiments of the present disclosure. In this example, a user 202 (e.g., a client operating on a client device) can obtain access to resources provided as part of a resource provider environment 204. In this example, the resources may include, at least in part, one or more language modules and associated components that may be utilized to influence search results, responsive messages to inquiries, generation of messages, and the like. These resources can include physical and virtual resources that may be located at one or more locations controlled by the provider or a third-party, or may be located on a location controlled by the user, or an entity with which the user is associated. In this example, a user can utilize the client device 202 to access resources of the resource provider environment 204 over one or more networks 206. The client device 202 can include any appropriate electronic device operable to send and receive requests, messages, or other such information over an appropriate network and convey information back to a user of the device. Examples of such client devices include personal computers, tablet computers, smart phones, notebook computers, and the like. The network(s) 206 can include any appropriate network, including an intranet, the Internet, a cellular network, a local area network (LAN), or any other such network or combination, and communication over the network can be enabled via wired and/or wireless connections. The resource provider environment 204 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 204 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the resource provider environment 204 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In this example, a request to the resource provider environment 204 can be received by an interface layer 208 of the environment. As known for network environments, the interface layer can include components such as interfaces (e.g., APIs), load balancers, request and/or data routers, and the like. In various embodiments, the request can include a command to execute one or more functions within the resource provider environment 204. Moreover, in at least one embodiment, the request may also include data for executing the request. As an example, the data may include credentials to associate the user 202 with one or more accounts in an account database 210. The account database 210 may store user information, user preferences, or user classifications. For example, if the user is a provider within a marketplace, the account database 210 may include information related to products or services offered by the user 202, user preferences for search or information gathering, user permissions related to resource utilization, and the like. Furthermore, it should be appreciated that various other systems may be accessible after the user 202 is authorized to proceed, but these other systems may be separately hosted, but in communication with the resource provider environment 204.

In at least one embodiment, the request is associated with an update or adjustment to one or more language models utilized by the resource provider environment. Language models may include one or more trained machine learning systems that use statistical and probabilistic techniques to determine the probability of a given sequence of words occurring within a phase or sentence. These systems may be trained, at least in part, based on historical action data (e.g., data included in the query log, a click log, and a purchase log). Moreover, language models may be trained over a corpus of information within a domain or classification. As a result, reference to a language model may also refer to a plurality of language models, where different portions of various models may be trained based, at least in part, on a desired category or domain. A language model can be of any word length. Example language models include one word language models (unigram), two word language models (bigram), three word language models (trigram), etc. Language models can be associated with a weighting factor. The weighting factors associated with the language models can be different, the same, or a combination thereof. For example, the weighting factor associated with a three-word word set can be associated with a first weighting factor, probabilities associated with a two-word word set can be associated with a second weighting factor, and probabilities associated with a one-word word set can be associated with a third weighting factor. In accordance with an embodiment, the first weighting factor can be greater than the second weighting factor, and the second weighting factor can be greater than the third weighting factor. Training the language models can include determining a weighting factor for a respective language model. For example, the historical data can be analyzed using, for example, a neural network to determine an appropriate weighting factor for each of the language models. As will be apparent to persons of reasonable skill in the art, training a language model is well known and such approaches will not described further herein. In at least one embodiment, at least one language model is utilized with search queries to determine items (e.g., products, content, etc.) responsive to the search queries.

In this example, a language model manager 212 may be utilized to maintain and direct queries toward one or more language models 214. For example, the language model manager 212 may direct a query, or portions thereof, to one or more language models 214 for evaluation. Moreover, the language model manager 212 may determine whether one or more language models 214 are due for refinement or updates. By way of example, the language models 214 may be periodically updated to account for changes in word use, adjustments in user purchasing or search behavior, and the like. In at least one embodiment, language models 214 may be large systems where retraining and updating is challenging, often taken considerable resources and time periods. Such a system may be unsuitable for dynamically changing search and purchasing habits, where breaking news events may influence what words or phrases uses utilize and also the context of those words or phrases. As an example, a news story directed toward a new dietary trend may prompt more searches for the diet. In certain cases, the diet may have a nickname or short name that is already associated with another known term. By way of example, the Paleolithic era is already an established time period, but may also be referred to by the "paleo diet" or "being paleo" where the context of the known word (or portion of the word) changes the desired result. As another example, a carnivore is an animal that eats meat (exclusively or substantially exclusively), but the "carnivore diet" provides a different context to the search. Similar examples may be found in a variety of other domains, such as new product names, emerging illnesses, and the like. A manufacturer producing a product associated with the new context for the term may desire to have searches or queries associated with that term also be identified with their products or services. However, language models may be slow to update, which may cost the manufacturer sales.

Various embodiments of the present disclosure include a crawler/forecaster 216 to identify trending entities (e.g., words or phrases used frequently) for supplementing and dynamically updating the one or more language models 214. In one or more embodiments, the crawler/forecaster 216 curates a list of trending entities, where what qualifies as "trending" may be associated, at least in part, with one or more rules directed toward a frequency of use of a word or phrase, or a permutation of the word or phrase. As an example, use of a word or phrase over a threshold number of times may classify the term as a "trending" term. The crawler/forecaster 216 may evaluate one or more web sources 218 to identify popular and frequently discussed topics. By way of example only, an online message board may be a source of information related to newly trending topics, where a popular message board topic may be considered trending. A unique phrase or context may provide additional evidence that certain entities are trending. As another example, a number of mentions on a social media platform may also indicate a trending entity. As noted above, these entities may be evaluated to determine their context, which may be another factor in determining whether the entity is trending and/or if the entity is used in a sufficiently different context compared to the existing formulation within the one or more language models 214 to justify an update or refinement.

In one or more embodiments, the crawler/forecaster 216 may also be used to predict or forecast future trending entities. For example, predictions may be based, at least in part, on previous customer data. One or more machine learning systems may be utilized in order to generate the predictions, such as evaluating different features of previously trending words (e.g., how often words were used over a period of time, a growth rate or word use, an appearance in particular publications, etc.) to determine future trending entities, which may enable dynamic training earlier than waiting until words or phrases are deemed to be trending. Additionally, historical information, which may not be associated with the user, may also be utilized to develop one or more models to predict or forecast which entities may become trending. By way of example only, identification of certain terms or phrases within popular message boards or influential publications may be indicative of a future trending entity.

In this example, a trending database 220 may store trending entities for evaluation. For example, the list generated by the crawler/forecaster 216 may be saved and stored for later evaluation. In one or more embodiments, items may be stored for a period of time prior to use to determine whether the entity is still trending or worth the resource use of preparing an updated model. For example, an entity trending for a single hour may not justify the resource expenditure, while an entity that has been trending for several days may justify the resource expenditure. In at least one embodiment, the entities may be categorized within the database 220, for example sorted by class or domain.

An entity weight tuner 222 may be utilized to determine weights for different trending entities for inclusion within a language model. In at least one embodiment, the entity weight tuner 222 is implemented as an AutoML system that provides methods and processes to automate machine learning. For example, an AutoML system may enable a user to provide labeled training data and input and then output an optimized model. Furthermore, it should be appreciated that reference to AutoML may cover a pipeline that includes raw datasets to deployable machine learning models, with different systems automating a variety of different tasks. AutoML solutions may be simpler, faster, and cheaper to produce than designed or specialized models, and may be more accessible to users that do not have an extensive background or knowledge base for coding or developing machine learning system. In various embodiments, the weight tuner 222 takes as an input, at least in part, trending entities from the database 220 and tuning data, which may be provided by the user 202. The tuning data may include text, audio, video, images, ground truth pairs, or any other information the user 202 wishes to associated with their particular model. For example, the user may provide contextual text showing how certain words or phrases are utilized with reference to their products or services. Moreover, as another example, the user may provide audio clips, where the audio clips are processed, for example using one or more natural language processing (NPL) algorithms. It should be appreciated that, in certain embodiments, the user 202 may not provide tuning information, and as a result, domain information may be utilized from at least one of a domain database 224 or a domain classifier 226.

The weight tuner 222 may be automated to evaluate input information based, at least in part, on the information provided. That is, one or more criteria may be utilized when optimizing entity weights. By way of example only, input information including text data may be evaluated to minimize perplexity. As another example, input information including audio data may be evaluated to minimize WER. Additionally, the domain classifier may be utilized to evaluate data (e.g., user information, user input information, trending entities, etc.) to determine a respective domain, such as a domain corresponding to one or more domains within the database 224. The weight is then determined from a precomputed domain for a weight map, which is tuned at training time. It should be appreciated that additional methods may also be incorporated to develop weights and/or weight maps. By way of example, image data may include one or more computer vision systems to identify and classify items within the image. Similarly, video data may use a combination of computer vision techniques, text based techniques (e.g., from captioning or text in the video), and audio techniques (e.g., NPL for dialog). Accordingly, it should be appreciated that a variety of approaches may be utilized to generate the weight mapping for dynamically updating the language models 214.

Various embodiments of the present disclosure incorporate a class based language model 228 that incorporates the weight mapping generated by the weight tuner 222 that may be used to generate an initial hypothesis representation, such as an n-best list or a lattice. The class based language model 228 may be one of the one or more language models 214 or may be a separate language model. In at least one embodiment, the class based model will have a unigram entry for "trending" whose weight can be dynamically updated and whose reference can be dynamically swapped to point to the trending entities list provided by the user 202 or within the database 220. It should be noted that, while a unigram entry is provided as an example, that various embodiments may include bigrams, trigrams, n-grams, and the like. In various embodiments, the class based language model 228 is particularized for users 202 based, for example, on input data provided by the user, on a user domain, on user account information, or the like. For example, different users may provide different input information, as various trending terms may impact their business concerns differently. As a result, embodiments of the present disclosure enable specific tuning of these systems in a lightweight package that can be frequently updated by changing the weighting table via adjustments made to input data.

Systems and methods may further incorporate a boosting language model 230, which may receive as an input the trending entities. In one or more embodiments, the boosting language model 230 may also, or alternatively, receive an output of the class based model 228. The boosting language model 230 may be used to rescore items, such as items within the initial hypothesis representation. By way of example, the boosting language model 230 may be a second machine learning model (e.g., ARPA, FST, etc.) that boosts the weights of the trending entities. In one or more embodiments, weights may be manually tuned by the user or may be automatically determined, for example, using a clustering algorithm. By way of example, trending entities within the initial hypothesis representation may be weighted higher or may have their weights increased, thereby increasing their importance with the class based language model 228 and/or any of the language models 214. This boosting may further emphasize the trending entities, enabling users to capture traffic associated with those searches or queries. In at least one embodiment, one or more third parties 232 may also utilize the system to receive minor dynamic updates to incorporate into their own hosted language models. For example, the third parties may wish to receive the updates, but incorporate them into separately hosted and maintained models.

In one or more embodiments, the langue models 214 may include a placeholder or entity that receives information from the class based language model 228 and/or the boosting language module 230. As a result, for different classes of items, the language models 214 may be dynamically updated using outputs from the models 228, 230, which are smaller, easier to execute, and may be specifically tuned for individual users. Accordingly, users can provide training information, or opt-into a system where their domain is used with the weight tuner 222, to dynamically update associated language models 214 as new trending entities are identified. However, it should be appreciated that the class based language model 228 may also be provider language model or a master language model that includes the dynamically updated portion for individual users (e.g., based on tuning data) but may also be deployed for other users without the inclusion of the tuning data. Accordingly, it should be appreciated that various different language models may be generated and utilized with embodiments of the present disclosure, and in some embodiments, different language models may be particularly selected for updates or dynamic changes in different situations, such as scenarios where language models are specifically trained for different domains or use cases. Users may select a frequency or may provide information on an as-needed basis. Moreover, it should be appreciated that systems and methods may be extended to other areas that utilize language models, such as machine translations and the like, and that use with search and/or product identification is provided as an illustrated example only.

Figure 3:
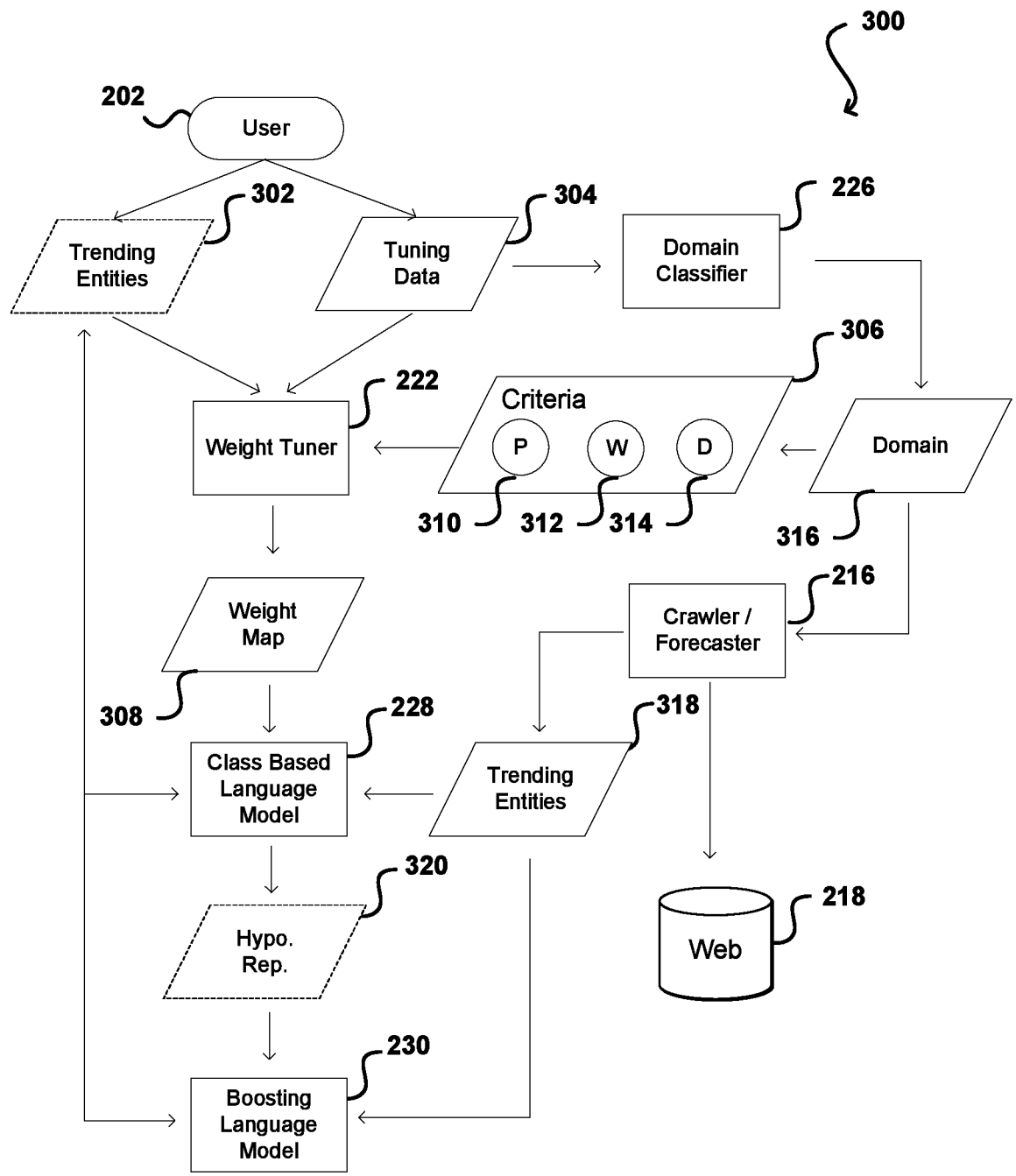
FIG. 3 illustrates a workflow to execute aspects of various embodiments.

FIG. 3 illustrates a workflow 300 that may be used to implements embodiments of the present disclosure. It should be appreciated that various embodiments may include additional steps or data outputs and that the illustrated workflow is provided by way of example only. Furthermore, in certain instances, like numerals have been used to illustrate like elements. Such numbering is for convenience only and not intended to limit the scope of the present disclosure. In this example, the user 202 may begin by providing input data to the weight tuner 222, which in this instance corresponds to user trending entities 302 and tuning data 304. As noted above, in various embodiments one or both of the trending entities 304 and the tuning data 304 may be optional inputs and the user 202 may elect to allow the provider to determine various tuning and/or trending entity information. Along a first path, the information is provided to the entity weight tuner 222, which may include one or more AutoML systems that utilize criteria 306 to develop a weight map 308. In one or more embodiments, and by way of example only, the criteria may include steps to minimize perplexity 310, minimize WER 312, or be domain based 314, for example based on a domain 316 identified by the domain classifier 226. Three criteria are shown as an example, and various embodiments may include more or fewer, as well as combinations of the criteria. It should be appreciated that the domain 316 may correspond to a domain for the user 202, for products provided by the user 202, for an industry of the user 202, and/or be based, at least in part, on the tuning data provided by the user. Furthermore, it should be appreciated that, in various embodiments, at least a portion of the tuning data may be acquired by the provider based, at least in part, on user account information.

In at least one embodiment, the crawler/forecaster 216 accesses one or more web sources 218 in order to generate a list or database of crawler trending entities 318. For example, as noted above, the crawler/forecaster 216 may evaluate various web sources, such as online message boards or social media, to identify one or more trending entities. Additionally, the crawler/forecaster 216 may be used to predict or otherwise estimate potential trending entities based, at least in part, on usage patterns, news stories, sentiment information, and the like. For example, as a news story gains traction and more users are discussing the story on a message board, the crawler/forecaster 216 may predict that such an entity is likely to be a future trending entity and may pre-emptively provide the entity information to at least one of the class based language model 228 or the boosting language model 230. Accordingly, in various embodiments, the crawler/forecaster 216 may also access historical information, such as historical information for users are historical information related to previous trending entities, which may be stored in a database.

As noted herein, the class based language model 228 may be dynamically tunable based, at least in part, on the weight map 308 utilized with the model 228, where the map 308 may be adjusted for different users, classes, domains, trending entities, and the like. In various embodiments, the class based language model 228 may generate an initial hypothesis representation 320, such as an n-best list or lattice. It should be appreciated that this is provided by way of example only and various other outputs may be generated by the class based language model. Furthermore, the output may be the model itself. In at least one embodiment, the initial hypothesis representation 320 may be provided to the boosting language model 230 for evaluation and rescoring. However, in other embodiments, the boosting language model 230 operates without input from the class based language model 228. Accordingly, embodiments of the present disclosure enable dynamic updates to language models based, at least in part, on outputs from the models 228, 230 which are tuned to user specifications and/or to trending entities.

Figure 4:
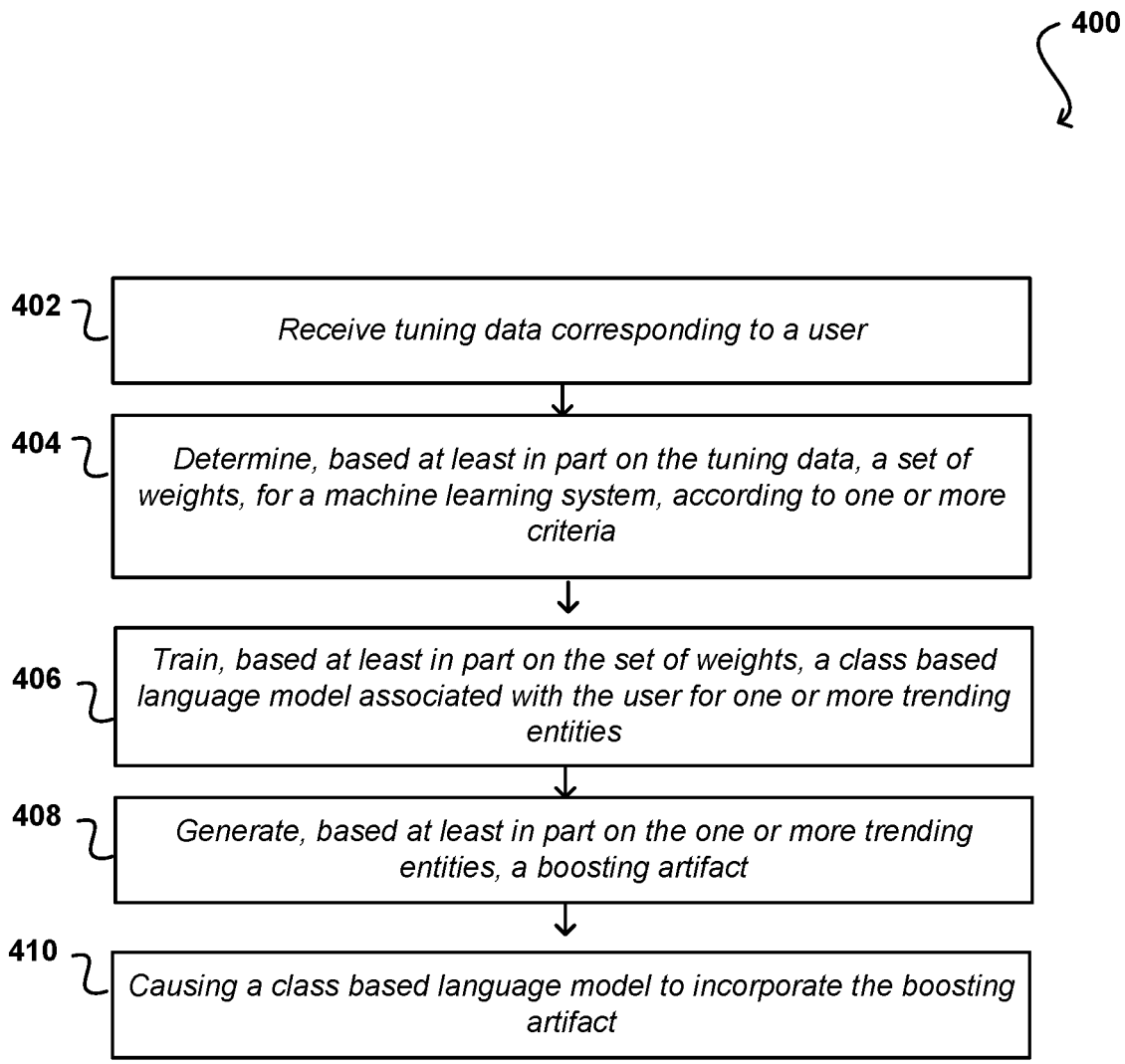
FIG. 4 illustrates an example process for tuning a language model in accordance with various embodiments.

FIG. 4 illustrates an example process 400 for dynamically updating a language model utilized in accordance with one embodiment. It should be understood for this and other processes discussed herein that there can be additional, alternative, or fewer steps performed in similar or alternative orders, or in parallel, within the scope of the various embodiments unless otherwise stated. In this example, tuning data is received 402 that corresponds to a user. In at least one embodiment, the tuning data includes information such as text data, audio data, video data, ground truth pairs, or a combination thereof associated with one or more properties of the user, such as a user's domain, a user's products, or the like. In at least one embodiment, a user may provide information directed toward context of one or more phrases with respect to their products or services.

In various embodiments, tuning data is used to determine a set of weights via an entity weight trainer 404. The entity weight trainer applies one or more criteria for developing the weights, which may correspond to a type of tuning data provided to the entity weight trainer 404. For example, text data may be evaluated to minimize perplexity while audio data may be evaluated to minimize WER. In at least one embodiment, weighting is based, at least in part, on domain information, which may be determined from the tuning data and/or properties of the user. The weights may be utilized to train a tuned, class based language model 406. For example, the class based language model 406 may reference the weights and may, in various embodiments, be particularly trained for one or more trending entities. Accordingly, the class based language model may be specifically trained and developed based on the user's desired tuning parameters with respect to one or more trending entities. As noted herein, the class based language model may use the weights to update or otherwise dynamically refine training as a dynamic placeholder entry.

In one or more embodiments, addition boosting or emphasis on trending entities may be beneficial for users attempting to update a language model. Accordingly, systems and methods may generate, based at least in part on the one or more trending entities, a boosting artifact 408. In various embodiments, a boosting language model may also be generated or built from various inputs, including the one or more trending entities. The boosting artifact may be used to rescore or otherwise update the class based language model to place particular emphasis on the trending entities. Accordingly, the boosting artifact may be incorporated into the class based language model 410. In this manner, systems and methods enable a dynamic update to the class based language model without fully retraining the class based language model. Instead, one or more examples include a placeholder segment within the class based language model that points to one or more dynamic models, thereby enabling light weight and efficient updates to the class based language model.

Figure 5:
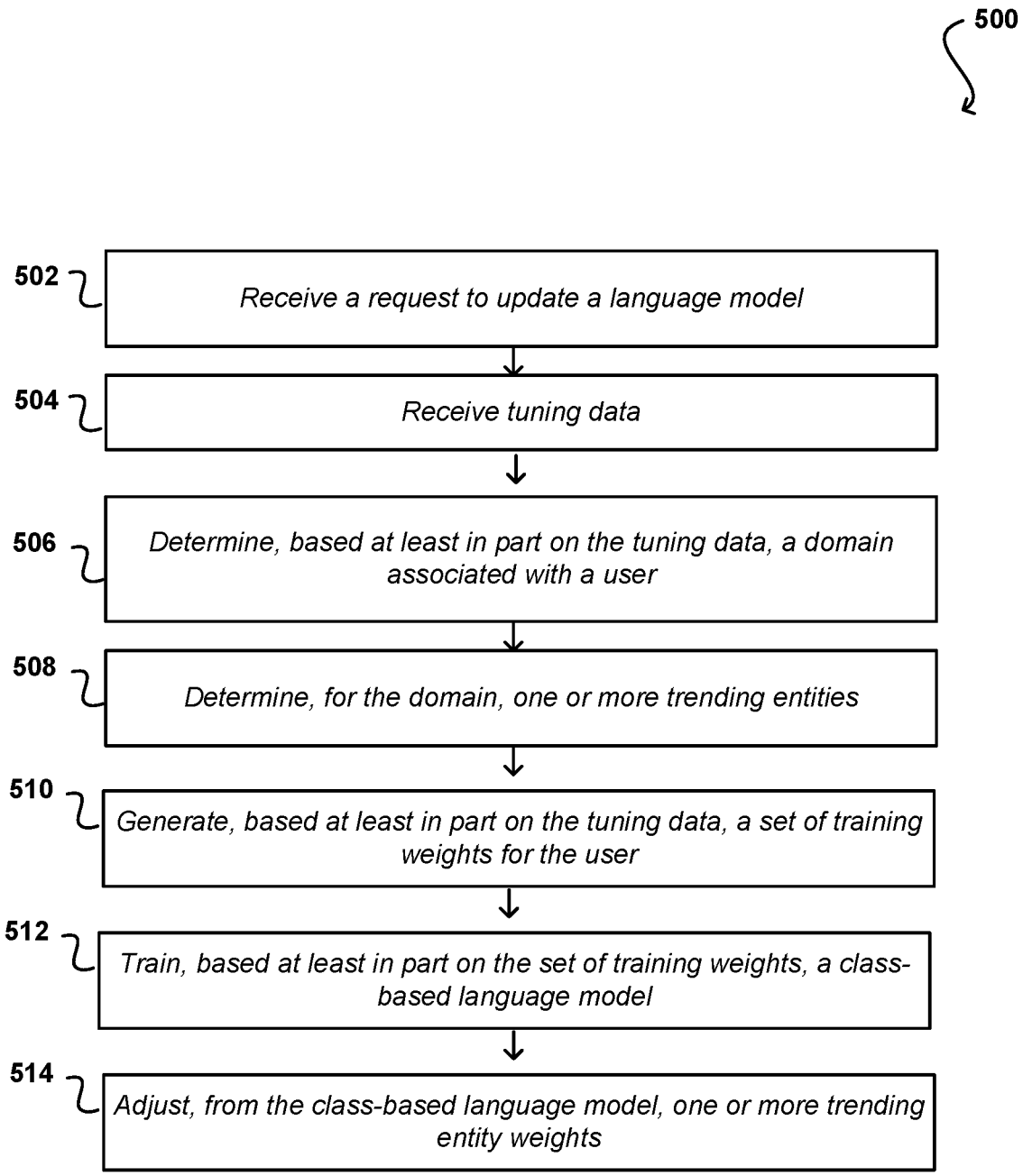
FIG. 5 illustrates an example process for tuning a language model in accordance with various embodiments.

FIG. 5 illustrates a process 500 for boosting weights from a language model that can be utilized in accordance with one or more embodiments. In this example, a request to update a language model is received 502. The request may be from a user or from an automated system that the user has subscribed to, as examples. In at least on embodiment, tuning data is received 504. Tuning data may be provided by a user, for example along with the initial request, or can be inferred based, at least in part, on user data. For example, a user account may provide information related to the tuning data. A domain associated with the user may also be determined based on the tuning data 506. For example, a domain classifier may evaluate the tuning data and select a domain for the user, the user's products or services, or the like. The domain may also be used to determine one or more trending entities 508. In at least one embodiment, the trending entities are selected, from a listing, that is generated via crawling one or more web sources.

In various embodiments, a set of training weights may be generated 510. An AutoML entity weight trainer may be used to generate the set of training weights, based at least in part on the tuning data and/or the domain. For example, different criteria may be applied to generate the set of training weights. The training weights may be used to generate boosting weights for the class based language model 512. As a result, the class based language model may be configured to dynamically point to one or more boosting artifacts for each user. The language model may be unique or otherwise specific to the user because the weights are based on the tuning information from the user. In at least one embodiment, the trending entities may be then utilized with a boosting language model to adjust weights or probabilities for the trending entities 514. For example, identification of particularized trending entities may lead to higher weights, thereby leading to more likely correlations when the model is utilized, for example with user searching.

Figure 6:
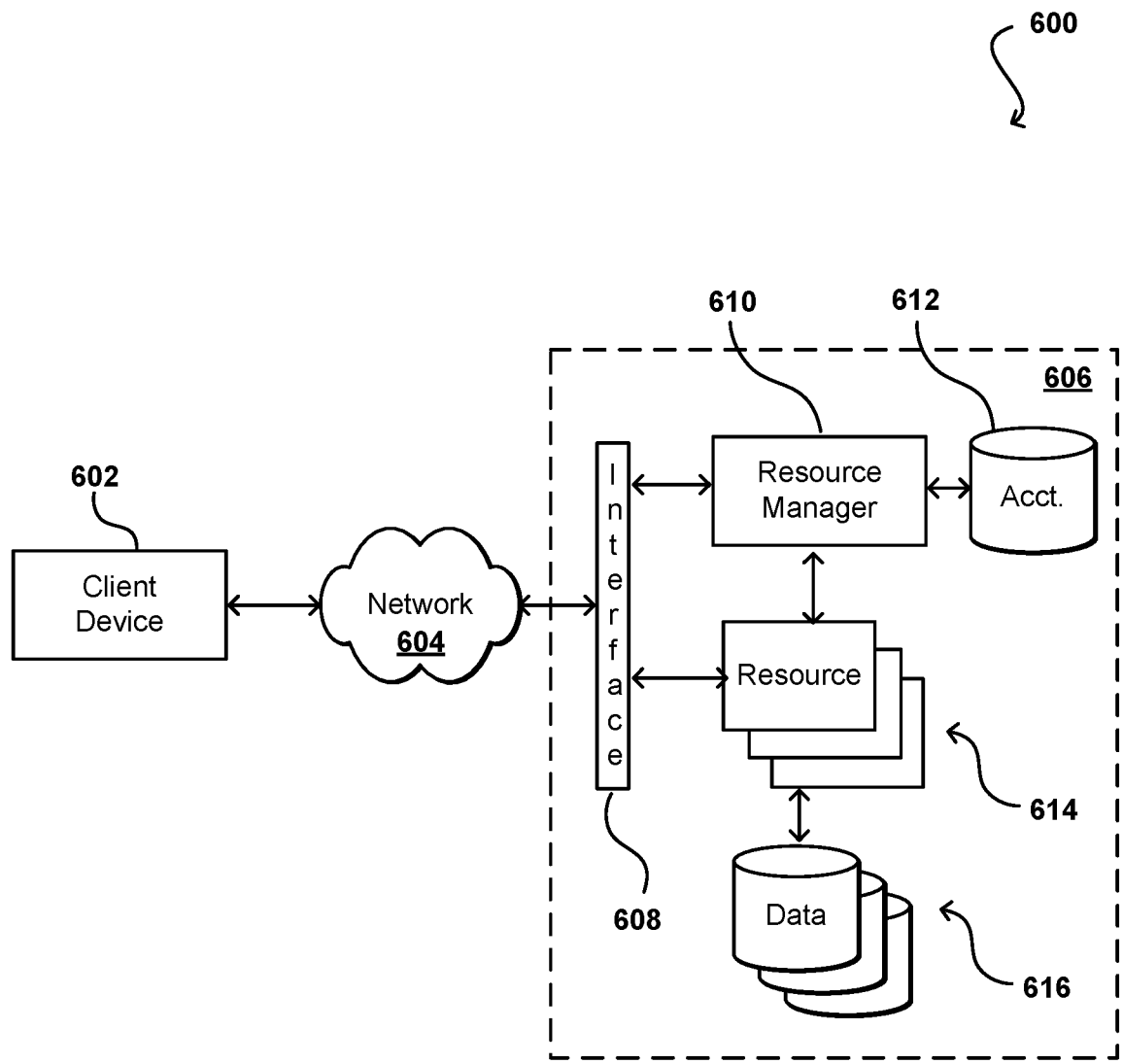
FIG. 6 illustrates an example environment in which various embodiments can be implemented.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
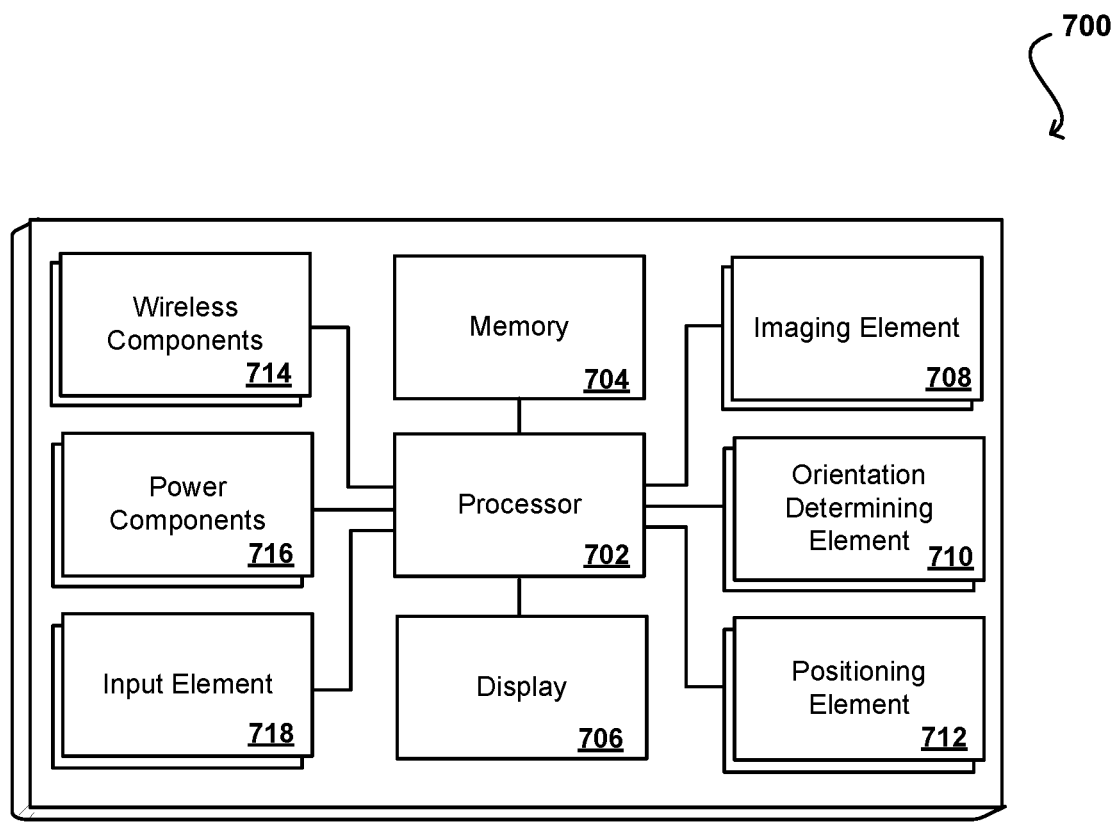
FIG. 7 illustrates example components of a computing device that can be used to implement aspects of the various embodiments.

FIG. 7 illustrates a set of basic components of an electronic computing device 700 that can be utilized to implement aspects of the various embodiments. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices. The device typically will include some type of display screen 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving tuning data from a user;
   providing the tuning data to an entity weight tuner, the entity weight tuner automatically generating a weight map based, at least in part, on one or more criteria associated with the tuning data;
   retrieving one or more trending entities from one or more web sources;
   generating a list of the one or more trending entities;
   generating a boosting artifact based, at least in part, on the weight map and the list of the one or more trending entities;
   providing, as a reference to a first language model, the boosting artifact; and
   providing, to a placeholder of a second language model that references the first language model, an output based on the boosting artifact.

2. The computer-implemented method of claim 1, wherein the one or more criteria correspond to at least one of a text-based criteria, an audio-based criteria, or a domain-based criteria, the one or more criteria being selected based, at least in part, on the tuning data.

3. The computer-implemented method of claim 1, further comprising:
adjusting one or more features of at least a portion of the output of the first language model via the boosting artifact.

4. The computer-implemented method of claim 1, further comprising:
determining a domain for the user, based at least in part on the tuning data; and
providing to the entity weight tuner, the domain.

5. The computer-implemented method of claim 1, wherein the tuning data comprises at least one of text data, audio data, video data, image data, or ground truth pairs.

6. A computer-implemented method, comprising:
determining one or more trending entities;
generating a weight map for a user within a class, the weight map based, at least in part, on one or more properties of the user;
training a first class based language model based, at least in part, on the weight map and the one or more trending entities; and
adjusting one or more features of a second class based language model, including one or more dynamic placeholder entries associated with the one or more trending entities and referencing the first class based language model, using a boosting artifact.

7. The computer-implemented method of claim 6, further comprising:
receiving, from the user, tuning data; and
determining, from the tuning data, the one or more properties of the user.

8. The computer-implemented method of claim 7, wherein the tuning data comprises at least one of text data, audio data, video data, image data, or ground truth pairs.

9. The computer-implemented method of claim 6, wherein the one or more properties correspond to a domain, further comprising:
determining the domain corresponding to the user based, at least in part, on stored user data.

10. The computer-implemented method of claim 6, wherein the one or more trending entities are extracted from one or more web sources via a crawler.

11. The computer-implemented method of claim 6, further comprising:
providing the one or more trending entities to a boosting language model;
providing, to the boosting language model, an initial hypothesis representation from the class based language model;
generating a second boosting artifact; and
providing the second boosting artifact to at least one of the first class based language model or the second class based language model.

12. The computer-implemented method of claim 6, further comprising:
determining a type corresponding to the one or more properties of the user; and
selecting a criteria for generating the weight map based, at least in part, on the type.

13. The computer-implemented method of claim 6, wherein at least a portion of the one or more trending entities are provided by the user.

14. The computer-implemented method of claim 6, wherein an automatic machine learning system executes an entity weight tuner to generate the weight map.

15. A system, comprising:
at least one processor; and
memory including instructions that, when executed by the at least one processor, cause the system to:
determine one or more trending entities;
generate a weight map for a user within a class, the weight map based, at least in part, one on or more properties of the user;
train a first class based language model based, at least in part, on the weight map and the one or more trending entities; and
adjust one or more features of a second class based language model, including one or more dynamic placeholder entries associated with the one or more trending entities and referencing the first class based language model, using a boosting artifact.

16. The system of claim 15, wherein the instructions when executed further cause the system to:
receive, from the user, tuning data; and
determine, from the tuning data, the one or more properties of the user.

17. The system of claim 15, wherein the one or more properties correspond to a domain and the instructions when executed further cause the system to:
determine the domain corresponding to the user based, at least in part, on stored user data.

18. The system of claim 15, wherein the one or more trending entities are extracted from one or more web sources via a crawler.

19. The system of claim 15, wherein the instructions when executed further cause the system to:
provide the one or more trending entities to a boosting language model;
provide, to the boosting language model, an initial hypothesis representation from the class based language model;
generate a second boosting artifact; and
provide the boosting artifact to at least one of the first class based language model or the second class based language model.

20. The system of claim 15, wherein the instructions when executed further cause the system to:
determine a type corresponding to the one or more properties of the user; and
select a criteria for generating the weight map based, at least in part, on the type.

* * * * *